US011931716B2

(12) United States Patent
Ozasa et al.

(10) Patent No.: US 11,931,716 B2
(45) Date of Patent: Mar. 19, 2024

(54) REACTION APPARATUS

(71) Applicant: KANEKA CORPORATION, Osaka (JP)

(72) Inventors: Shiori Ozasa, Takasago (JP); Takahiro Ohishi, Takasago (JP); Kosuke Tanaka, Takasago (JP)

(73) Assignee: KANEKA CORPORATION, Osaka (JP)

( * ) Notice: Subject to any disclaimer, the term of this patent is extended or adjusted under 35 U.S.C. 154(b) by 139 days.

(21) Appl. No.: 17/439,612

(22) PCT Filed: Jan. 28, 2020

(86) PCT No.: PCT/JP2020/002975
§ 371 (c)(1),
(2) Date: Sep. 15, 2021

(87) PCT Pub. No.: WO2020/189027
PCT Pub. Date: Sep. 24, 2020

(65) Prior Publication Data
US 2022/0152575 A1 May 19, 2022

(30) Foreign Application Priority Data
Mar. 20, 2019 (JP) .................................. 2019-053383

(51) Int. Cl.
*B01J 19/24* (2006.01)
*B05B 1/22* (2006.01)
(Continued)

(52) U.S. Cl.
CPC ............... *B01J 19/243* (2013.01); *B05B 1/22* (2013.01); *B05B 15/652* (2018.02);
(Continued)

(58) Field of Classification Search
CPC .... B01J 19/243; B01J 19/242; B01J 19/2425; B01J 8/067; B01J 2219/00087;
(Continued)

(56) References Cited

U.S. PATENT DOCUMENTS 2,081,432 A * 5/1937 Hapgood ............... A23C 3/033
261/121.1
5,810,473 A * 9/1998 Manabe ................ B08B 9/0933
366/132
(Continued)

FOREIGN PATENT DOCUMENTS

CN 2855542 Y 1/2007
CN 103832980 B 11/2015
(Continued)

OTHER PUBLICATIONS

Machine Translation of JP 2018-173239 (Year: 2018).*
(Continued)

*Primary Examiner* — Lessanework Seifu
(74) *Attorney, Agent, or Firm* — Birch, Stewart, Kolasch & Birch, LLP

(57) ABSTRACT

A reaction apparatus comprising at least one tubular reaction unit (23), a container (41) configured to accommodate the tubular reaction unit (23) and a temperature control medium (51) used in heat exchange with the tubular reaction unit (23), and a nozzle (31) configured to eject the temperature control medium (51) toward the tubular reaction unit (23) in the container. The reaction apparatus further comprising a movable part (34) configured to adjust an ejection direction of the nozzle (31) is preferred. The reaction apparatus allows for effectively performing the temperature control even when the tubular reaction unit is immersed in a temperature control medium.

8 Claims, 4 Drawing Sheets

(51) Int. Cl.
  *B05B 15/652* (2018.01)
  *B01J 19/00* (2006.01)
(52) U.S. Cl.
  CPC .. *B01J 19/0013* (2013.01); *B01J 2219/00099* (2013.01); *B01J 2219/00768* (2013.01)
(58) Field of Classification Search
  CPC .... B01J 2219/00094; B01J 2219/00099; B01J 2219/00166; B01J 2219/0013; B01J 2208/00212; B01J 2208/00221; B05B 15/652; B01F 25/212; B01F 25/2121; B01F 25/2122
  See application file for complete search history.

(56) References Cited

U.S. PATENT DOCUMENTS

| | | | |
|---|---|---|---|
| 2010/0112094 A1 | 5/2010 | Yoshida et al. | |
| 2012/0142974 A9* | 6/2012 | Fetsko | B01D 9/0009 568/744 |
| 2016/0046490 A1 | 2/2016 | Yoshida et al. | |
| 2018/0030181 A1* | 2/2018 | Emoto | C08F 10/02 |
| 2019/0126230 A1 | 5/2019 | Ozasa et al. | |
| 2019/0144404 A1 | 5/2019 | Yasukouchi et al. | |
| 2020/0139339 A1 | 5/2020 | Ozasa et al. | |

FOREIGN PATENT DOCUMENTS

| | | |
|---|---|---|
| CN | 204865802 U | 12/2015 |
| CN | 104984706 B | 1/2017 |
| DE | 1 275 512 B | 8/1968 |
| JP | 56-47735 U | 4/1981 |
| JP | 2018-173239 * | 11/2018 |
| WO | WO2017/222048 A1 | 12/2017 |
| WO | WO2018/016376 A1 | 1/2018 |
| WO | WO2019/026425 A1 | 2/2019 |

OTHER PUBLICATIONS

International Search Report, issued in PCT/JP2020/002975, PCT/ISA/210, dated Mar. 31, 2020.
Written Opinion of the International Searching Authority, issued in PCT/JP2020/002975, PCT/ISA/237, dated Mar. 31, 2020.
European Patent Office Communication and Extended Search Report issued in the corresponding European Patent Application No. 20774190.1 dated Nov. 8, 2022.

* cited by examiner

[FIG. 1]
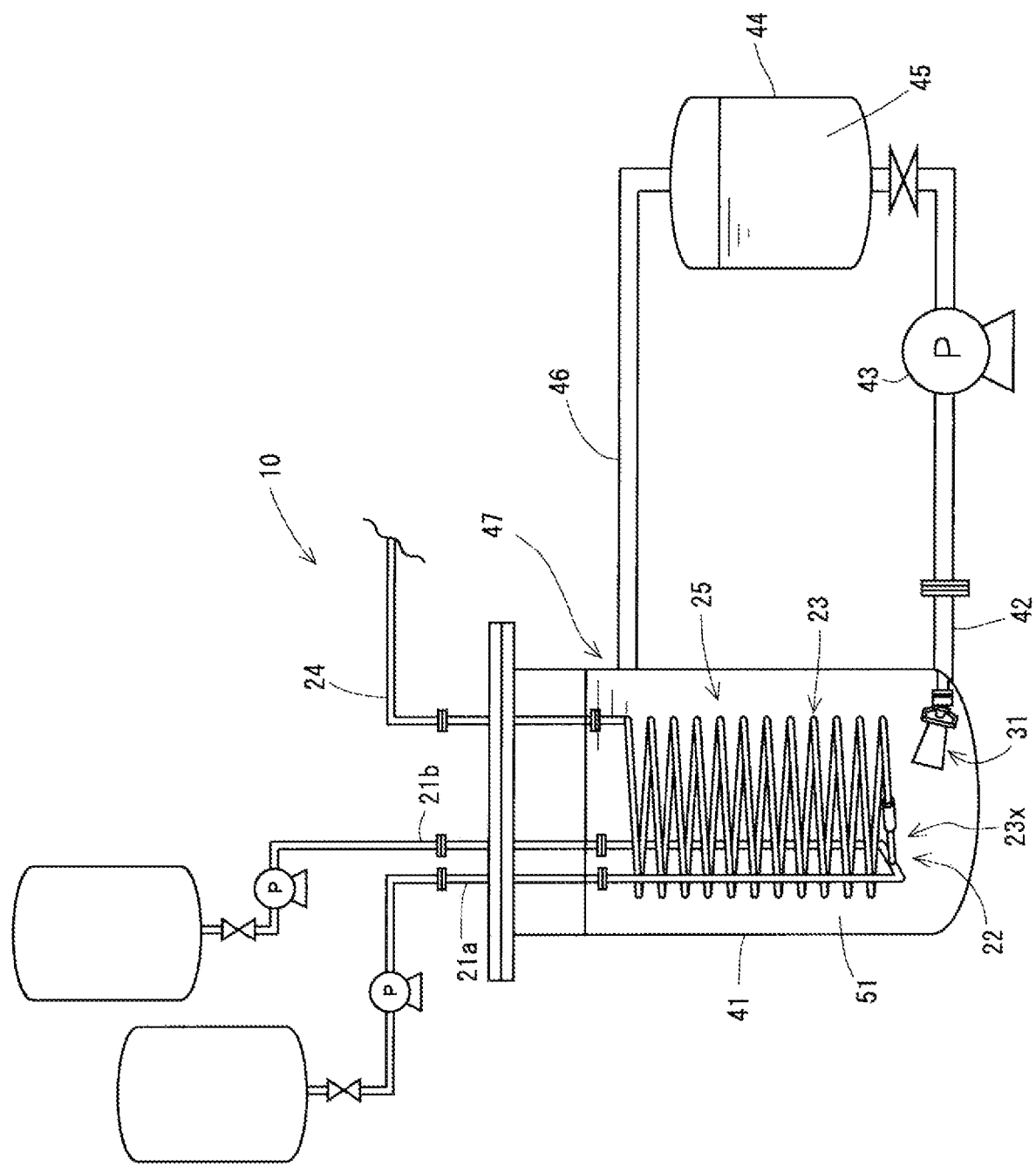

[FIG. 2]
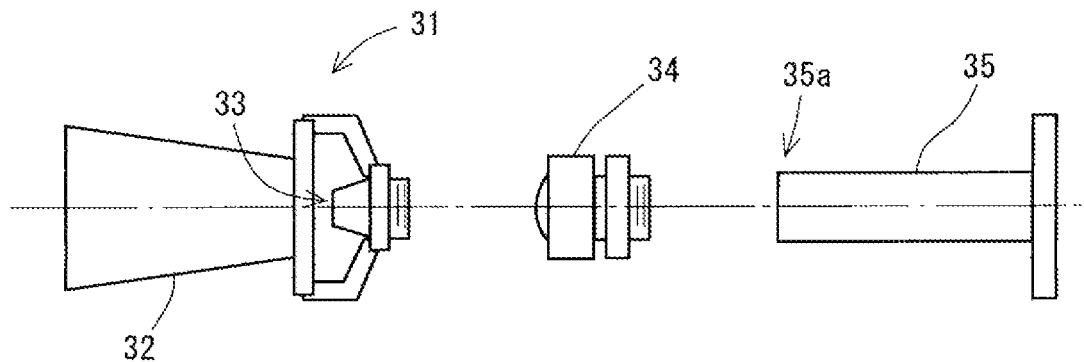
[FIG. 3A]
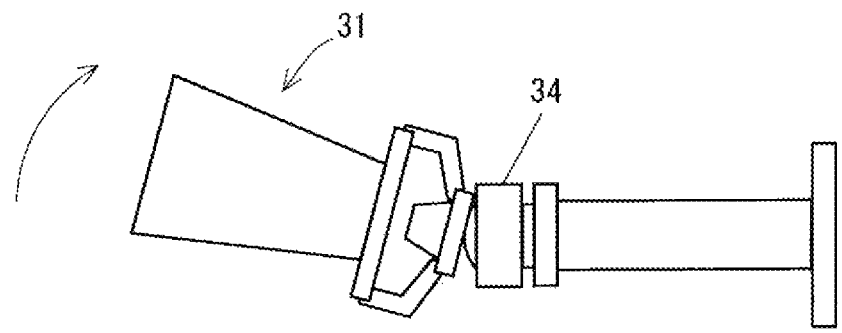
[FIG. 3B]
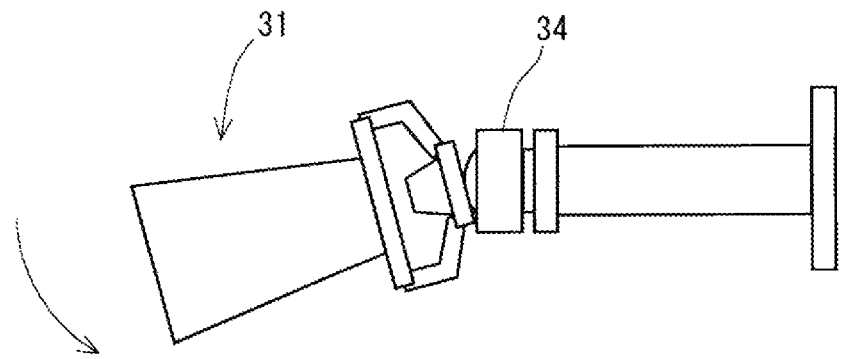

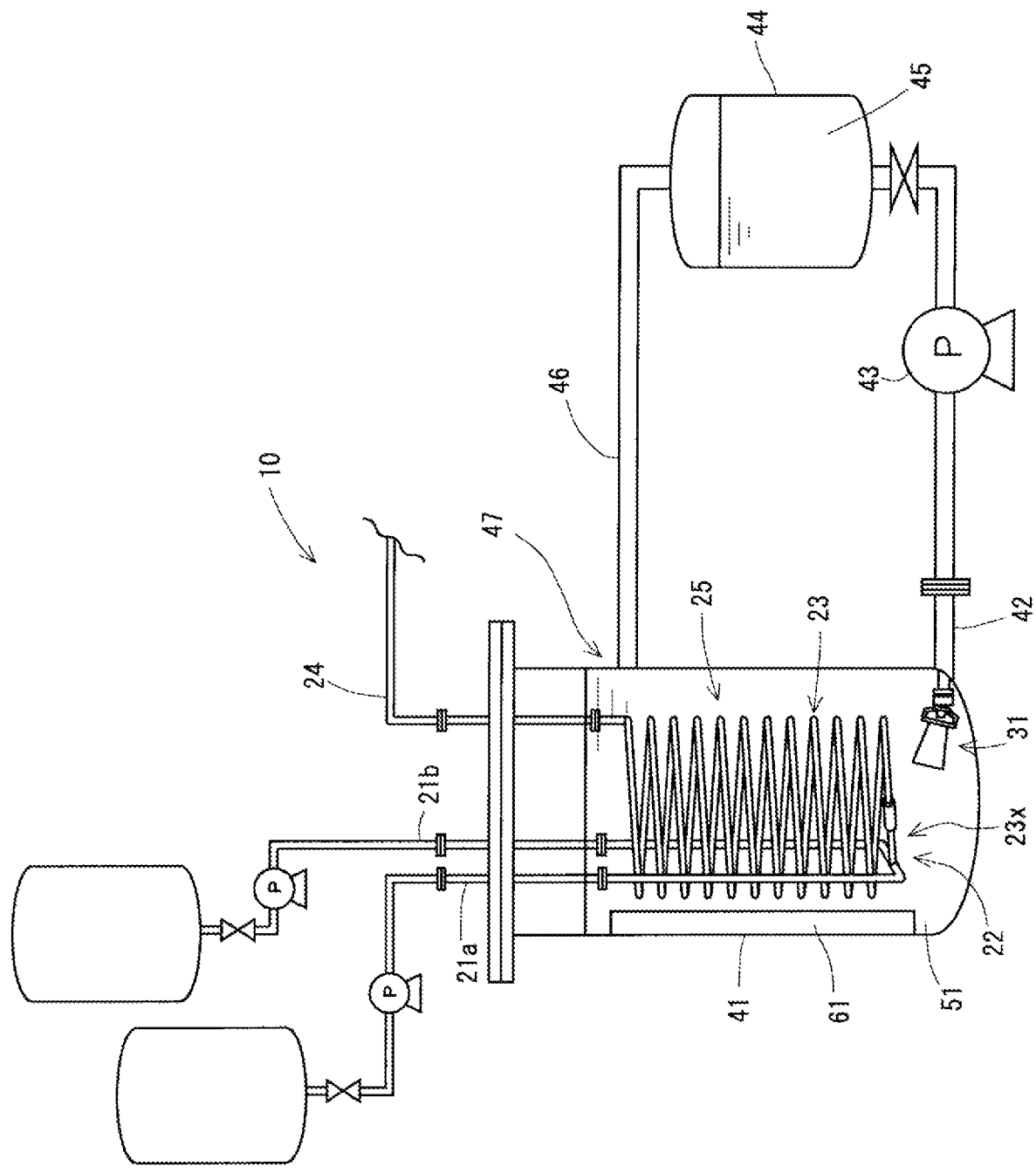
[FIG. 4]

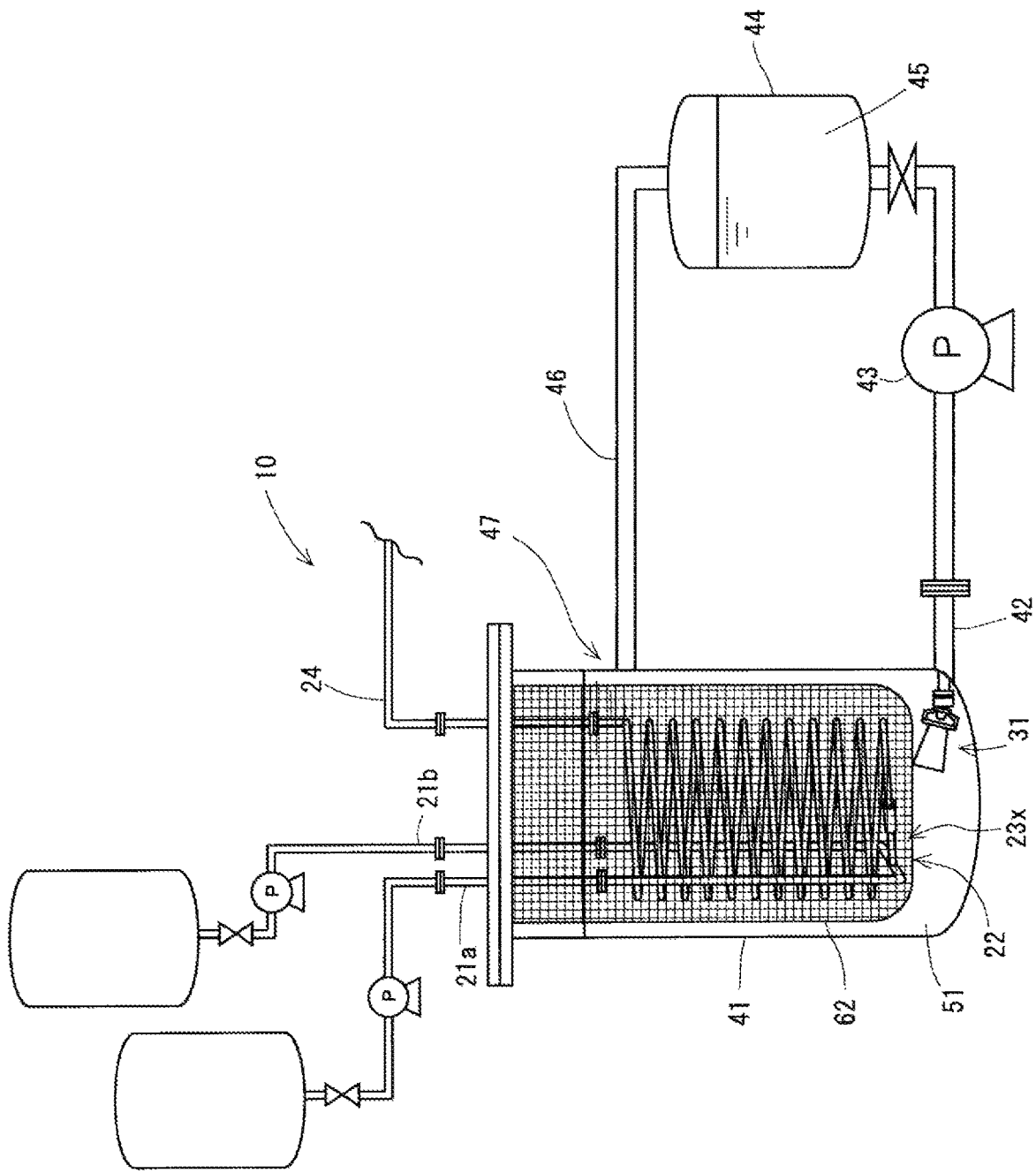
[FIG. 5]

REACTION APPARATUS

TECHNICAL FIELD

The present invention relates to a reaction apparatus including a tubular reaction unit.

BACKGROUND ART

A flow reactor is such that the diameter of a flow channel of a micro-flow reactor is enlarged to the order of millimeters or centimeters; is a chemical reaction apparatus that has improved operability and an increased processing amount as compared with a micro-flow reactor while maintaining high-speed mixing performance, precise temperature controllability, and precise retention time controllability of the micro-flow reactor; and includes a raw material feeding unit and a reaction unit to allow raw materials to react. The flow reactor has attracted attention in recent years because, as compared with a batch reactor, the whole process can be made more compact, and the speed and efficiency of reaction can be increased (Patent Documents 1 and 2, and the like).

RELATED ART DOCUMENTS

Patent Documents

Patent Document 1: WO 2017/222048 (A1)
Patent Document 2: WO 2018/016376 (A1)

SUMMARY OF THE INVENTION

Problems to be Solved by the Invention

However, it has been found that, even though the flow reactor is used, precise temperature control becomes difficult when the amount of heat generated or the amount of heat absorbed in a reaction is large or when the reactor becomes large in scale. Thus, it is conceivable to immerse the entire reaction unit of the reactor in a temperature control medium, but still the temperature control is insufficient. In particular, the temperature control of the reaction unit is usually performed by stirring a temperature control medium to make the temperature distribution of the medium uniform. However, since a flow path of a reaction tube is complicated in the flow reactor, there is no space for introducing a stirring means such as a stirring impeller, or even if a stirring means can be introduced into the flow reactor, there is an area where the medium is difficult to stir, and thus it has been difficult to make the temperature distribution of the medium uniform. Therefore, an object of the present invention is to effectively perform the temperature control even when a tubular reaction unit is immersed in the temperature control medium.

Solutions to the Problems

The inventors have made intensive studies to solve the above problems. As a result, the inventors have changed the conventional thinking that making the temperature distribution of the temperature control medium uniform is desirable, and found that when a medium at a predetermined temperature is ejected aiming at a tubular reaction unit (preferably a heat generating part or a heat absorbing part of the tubular reaction unit), a reaction temperature can be rather controlled efficiently and precisely since the place of a heat generating part or a heat absorbing part is limited in the tubular reaction unit. The present invention has been completed based on this finding.

That is, the present invention is as follows.

[1] A reaction apparatus comprising
at least one tubular reaction unit,
a container configured to accommodate the tubular reaction unit and a temperature control medium used in heat exchange with the tubular reaction unit, and
a nozzle configured to eject the temperature control medium toward the tubular reaction unit in the container.

[2] The reaction apparatus according to [1], further comprising a movable part configured to adjust an ejection direction of the nozzle.

[3] The reaction apparatus according to [1] or [2], wherein an ejection speed of the temperature control medium from the nozzle is 0.1 to 2 m/s.

[4] The reaction apparatus according to any one of [1] to [3], wherein a difference between a temperature of the temperature control medium on a place where the temperature control medium impinges on a heat generating part or a heat absorbing part of the tubular reaction unit and a temperature of the temperature control medium flowing out of the container is 1° C. or higher.

[5] The reaction apparatus according to any one of [1] to [4], wherein the container comprises a resistance member configured to interrupt a flow of the temperature control medium or a flow regulation member configured to regulate a flow of the temperature control medium.

[6] The reaction apparatus according to any one of [1] to [5], wherein the tubular reaction unit is a tubular reaction line of a flow reactor.

[7] The reaction apparatus according to [6], wherein the tubular reaction line has a helical shape.

[8] The reaction apparatus according to [6] or [7], wherein the flow reactor further comprises a raw material feeding line provided on an upstream side of the tubular reaction line, and a discharge line provided on a downstream side of the tubular reaction line and configured to discharge a reaction product produced in the tubular reaction line.

[9] The reaction apparatus according to [8], wherein at least one of the flow reactor comprises two or more of the raw material feeding lines, and further comprises a mixing unit between the raw material feeding lines and the tubular reaction line configured to mix raw materials fed from the two or more raw material feeding lines and send a mixture to the tubular reaction line.

Effects of the Invention

According to the present invention, the temperature control medium is ejected from the nozzle toward the tubular reaction unit, and therefore, temperature control can be efficiently performed with high precision in the tubular reaction unit.

BRIEF DESCRIPTION OF THE DRAWINGS

FIG. 1 is a conceptual view illustrating one example of a reaction apparatus of the present invention.

FIG. 2 is an exploded view of a nozzle used in the present invention.

FIG. 3 is a conceptual view illustrating a usage state of a nozzle used in the present invention.

FIG. 4 is a conceptual view illustrating another example of a reaction apparatus of the present invention.

FIG. 5 is a conceptual view illustrating yet another example of a reaction apparatus of the present invention.

MODE FOR CARRYING OUT THE INVENTION

Hereinafter, the present invention will be described in more detail with reference to the drawings.

FIG. 1 is a conceptual view illustrating one example of a reaction apparatus of the present invention.

A reaction apparatus 10 in FIG. 1 includes a flow reactor 25 including two raw material feeding lines 21a and 21b, a mixing unit 22 to mix raw materials fed from these raw material feeding lines, a tubular reaction line 23 to cause a raw material mixture prepared in the mixing unit 22 to react, and a discharge line 24 to discharge the mixture from the tubular reaction line; a container 41 (can-type container in the illustrated example) to accommodate the flow reactor 25; and a medium 51 (water in the illustrated example) that is accommodated in the container 41 and controls the temperature of the tubular reaction line 23. Therefore, even if the reaction occurring in the tubular reaction line 23 is an exothermic reaction or an endothermic reaction, the reaction temperature in the reaction line 23 is appropriately adjusted.

Further, in the present invention, a nozzle 31 to eject the temperature control medium toward the tubular reaction line 23 is provided in a part (rounded section in the illustrated example) of the container 41. By ejecting the temperature control medium from the nozzle 31 toward the tubular reaction line 23, particularly toward a part 23x where heat generation or heat absorption becomes largest (hereinafter often referred to as "heat generating part or heat absorbing part"), it is possible to perform the temperature control more efficiently with high precision. Whether or not the ejection of the temperature control medium is directed to the heat generating part or the heat absorbing part can be determined by whether or not the flow velocity of the temperature control medium at the heat generating part or the heat absorbing part is larger than the flow velocity of the temperature control medium at any other place in the tubular reaction line. In the illustrated example, the ejection from the nozzle is performed by means of a discharge force from a pump 43 attached to the nozzle. The pump 43 sucks a temperature control medium 45 accommodated in a temperature-controlled tank 44 and sends it to the nozzle 31. The tank 44 accommodating the medium is provided with a return line 46 for returning the temperature control medium flowing out of the container 41 to be adapted to circulate the temperature control medium in its entirety.

FIG. 2 and FIG. 3 each show a schematic exploded view illustrating an example of the nozzle 31. As shown in FIG. 2 and FIG. 3, the nozzle 31 has a tubular portion 32 to define an ejection direction and an ejection orifice 33 and is connected to a tip 35a of an insertion tube 35 via a ball joint 34. The insertion tube 35 is inserted into the container 41 through an introduction tube 42 attached to the outer wall of the container 31 so that the tip 35a protrudes into the interior of the container 41, whereby the nozzle 31 can be arranged within the interior of the container 41. The nozzle 31 is rotatable around the ball joint 34 so as to set an ejection direction appropriately. As shown in FIG. 3A, the nozzle 31 may be directed upward, so that an ejected stream can directly impinge on the heat generating part or the heat absorbing part, or as shown in FIG. 3B, the nozzle 31 may be directed downward, and a stream may be ejected to flow in accordance with a shape of the rounded section at a lower portion of the container 41 to blow up the ejected stream from an endpoint of the rounded section, so that the ejected stream can impinge on the heat generating part or the heat absorbing part by appropriately utilizing the shape of the inner surface of the container.

The inner diameter of the tubular reaction line is, for example, 0.1 mm or more, preferably 0.2 mm or more, and more preferably 0.3 mm or more, and for example, 100 mm or less, preferably 50 mm or less, and more preferably 20 mm or less.

The length (entire length) of the tubular reaction line is preferably 1 cm or more, more preferably 10 cm or more, still more preferably 50 cm or more, particularly preferably 1 m or more, and most preferably 5 m or more. The upper limit of the length of the tubular reaction line is not particularly limited, and is preferably 200 m or less, more preferably 100 m or less, and still more preferably 50 m or less.

The shape of the tubular reaction line is not particularly limited insofar as the tubular reaction line can be accommodated in the container, and is, for example, a curved shape, and preferably a helical shape. Allowing the tubular reaction line to have a helical shape make it possible to make the tubular reaction line compact and to improve the easiness of accommodating it in the container.

When the tubular reaction line has a helical shape, an apparent volume (S×H) of a helix determined from a length (H) of a traveling axis of the helix and an area (S) of a helix projected on a plane orthogonal to the traveling axis (hereinafter may be referred to simply as "projected area") is, for example, 0.5% or more, preferably 2% or more, and more preferably 10% or more, and for example, 90% or less, preferably 80% or less, and more preferably 60% or less with respect to a size (internal capacity, etc.) of the container.

When raw materials are not mixed, for example, when a reaction is initiated by a catalyst provided inside the tube, a raw material feeding line or a mixing unit is not necessary. When three or more raw materials are mixed, three or more raw material feeding lines may be provided, and two or more mixing units may be provided depending on a mixing method.

When three or more raw material feeding lines are provided and two or more mixing units are provided as described above so as to have a plurality of tubular reaction lines, and a reactor part of each of the tubular reaction lines is wound into a helical shape, an apparent volume of each helix ($s_n \times h_n$; "h" represents a length in a traveling axis direction of the nth helix, and "s" represents a projected area of the nth helix) is determined, and the sum ($\Sigma(s_n \times h_n)$) of the determined apparent volumes is preferably within the numerical range for the above-mentioned apparent volume (S×H) of the helix.

A known mixer such as a T-shape mixer, a Y-shape mixer, a static mixer, and a helix-type mixer can be used in the mixing unit.

The present invention is aimed at controlling a reaction temperature in the tubular reaction unit, and a reaction tube having a diameter larger than that of the tubular reaction line may be used. For example, a column reaction tube may be used. In the column reaction tube, a column is typically filled with a suitable filler to cause a reaction between a circulating fluid and the filler. The inner diameter of the column reaction tube is, for example, 3 mm or more, preferably 10 mm or more, and more preferably 15 mm or more, and for example, 500 mm or less, preferably 300 mm or less, and more preferably 200 mm or less. The column reaction tube may have a plurality of raw material feeding lines and a mixing unit as needed, but usually has one raw material feeding line and no mixing unit.

The number of tubular reaction units accommodated in the container may be one as in the illustrated example, or two or more.

The size (internal capacity, etc.) of the container is not particularly limited, and is, for example, 0.5 L or more, preferably 5 L or more, and more preferably 50 L or more. The upper limit of the size (internal capacity, etc.) of the container is not particularly limited, and is preferably 1000 L or less, and more preferably 500 L or less.

The temperature control medium accommodated in the container may be a gas, but is preferably a liquid because it has a high heat capacity per unit volume. Examples of the liquid include water, an aqueous solution, and alcohols such as ethylene glycol, and water is preferable. Further, these media may be a medium that itself acts as a deactivator for a reaction solution, or the temperature control medium may contain a deactivator. When the temperature control medium has deactivation action, even if the reaction solution leaks from the tubular reaction unit, it is possible to prevent a reaction from occurring outside the reactor part, leading to safety.

The nozzle to eject the temperature control medium is directed toward the tubular reaction unit, preferably towards the heat generating part or the heat absorbing part. The position of the heat generating part or the heat absorbing part differs depending on the reaction, but the heat generating part or the heat absorbing part is often, for example, a part just behind the mixing unit or a starting part of the tubular reaction unit.

For the direction control of the nozzle to eject the temperature control medium, not only a ball joint but also a known movable part can be used, and for example, various oscillating mechanisms can be used. The movable part used for the direction control may be of a manual type or may have a remote control mechanism. Further, the nozzle may be a nozzle having no movable part, that is, a nozzle facing only a fixed direction. Without a plurality of reactions performed using the reaction apparatus of the present invention (that is, without rendering the reaction apparatus for multi-purpose use), when the reaction apparatus performs the same reaction (that is, when the reaction apparatus is for single-purpose use), the heat generating part or the heat absorbing part does not change, and thus the temperature can be appropriately controlled even using a nozzle facing only in a fixed direction. The nozzle facing only a fixed direction can be formed, for example, by connecting the nozzle 31 directly to the insertion tube 35 not via the ball joint 34 in the example of FIG. 2 or FIG. 3. Even when the nozzle facing only a fixed direction is used, a plurality of nozzles facing different directions may be mounted, and the amount of ejection from each of the nozzles may be adjusted to appropriately control the direction of ejection.

The number of nozzles having a movable part capable of direction control, or the number of nozzles facing only a fixed direction is not limited to one, and may be plural. Further, a position where the nozzle is mounted is not limited to the rounded section of the container, and the nozzle may be provided at an appropriate position, for example, on a side wall of the container.

The ejection speed of the temperature control medium from the nozzle is, for example, 0.1 m/s or more, preferably 0.2 m/s or more, and more preferably 0.3 m/s or more, and for example, 2 m/s or less, preferably 1.5 m/s or less, and more preferably 1 m/s or less. By increasing the ejection speed, it becomes easier to efficiently control the temperature of the heat generating part or the heat absorbing part of the tubular reaction unit.

There is preferably a temperature difference between a temperature of the temperature control medium at an outlet of the nozzle (hereinafter referred to as "temperature A1") or a temperature of the temperature control medium on a place where the temperature control medium impinges on the heat generating part or the heat absorbing part (hereinafter referred to as "temperature A2") and a temperature of the temperature control medium flowing out of the container (specifically, a temperature at an outlet 47; see FIG. 1; hereinafter referred to as "temperature B"). Due to the presence of the temperature difference, while the temperature of the heat generating part or the heat absorbing part of the tubular reaction unit is controlled to an appropriate temperature, without unnecessarily cooling or heating the other parts, the temperature of the entire tubular reaction unit can be controlled to an appropriate temperature. The temperature difference ($|A1-B|$ or $|A2-B|$) is, for example, 1° C. or higher, preferably 3° C. or higher, and more preferably 5° C. or higher, and for example, 20° C. or lower, preferably 15° C. or lower, and more preferably 10° C. or lower.

When a plurality of nozzles are provided, a weighted mean value ($\Sigma Tk\,Vk$) obtained by weighting the temperature Tk (k represents a nozzle number) of each of the nozzles by the ratio (Vk: k represents a nozzle number; the sum of Vks is 1) of the quantity of flow out of each of the nozzles is defined as the temperature of the temperature control medium at the outlet of the nozzle. When a plurality of outlets are provided, a weighted mean value obtained by weighting the temperature at each of the outlets by the ratio of the quantity of flow out of each of the outlets is defined as the temperature of the temperature control medium at the outlet.

In the container, a resistance member to interrupt a flow of the temperature control medium caused by the ejection, a flow regulation member to regulate a flow of the temperature control medium, or the like may be provided. Examples of the resistance member or the flow regulation member include a baffle 61 as shown in FIG. 4.

In the container, a porous member or a mesh member, as indicated by the reference numeral 62 in FIG. 5, that covers the tubular reaction unit may be mounted. By mounting the porous member or mesh member 62, the tubular reaction unit can be protected from the impact of the ejected stream. Further, the porous member or mesh member 62 produces a turbulent flow effect, and the temperature difference between the temperature control mediums in the container can be made suitable.

A reaction using the above reaction apparatus is not particularly limited. For, example, a raw material to be fed may be a gas or a liquid (including a solution of a raw material dissolved in a solvent), and a liquid raw material is often used. When a liquid raw material is used, it is preferable that, for example, a solution containing a compound having an SH group, an OH group, an $NH_2$ group, or an NHR group (where R represents an organic group) (hereinafter may be referred to simply as "compound A") and a solution containing an activated carbonyl compound such as phosgene or triphosgene be fed from separate raw material feeding lines and allowed to react in the reaction apparatus. The SH group, the OH group, or the NHR group reacts with phosgene or triphosgene, and a compound in which $ClC(=O)$-group is bonded instead of a hydrogen atom in the SH group, the OH group, or the NHR group is formed. The $NH_2$ group reacts with phosgene or triphosgene to be isocyanated. When a compound having two or more of the SH group, the OH group, the NHR group, and the like is used as a raw material to allow to react with phosgene, triphosgene, or the like, a compound can be formed in which a hydrogen atom is removed from each of two groups selected from the SH group, the OH group, the NHR group, and the like, and the groups are linked via a carbonyl group.

When triphosgene is used, it is preferred to also use an amine as a raw material. The use of an amine allows triphosgene to quickly change to phosgene, and the reaction with a compound A can be accelerated.

The amine may be mixed with the compound A in advance, and a liquid containing this mixture and a liquid containing triphosgene may be fed from separate raw material feeding lines and allowed to react. Alternatively, three raw materials including a liquid containing the compound A, a liquid containing triphosgene, and a liquid containing the amine are fed from separate raw material feeding lines, mixed in a single mixing unit, and then allowed to react in the tubular reaction line; or a mixture obtained by mixing the two raw materials in advance may be fed from a raw material feeding line, the remaining raw material may be fed from another raw material feeding line, and both may be mixed in the mixing unit and then allowed to react in the tubular reaction line.

Each of the above solutions containing the raw materials may contain a solvent as appropriate. The solvent is not particularly limited, and examples of the solvent include an aliphatic hydrocarbon-based solvent such as n-hexane, cyclohexane, or methylcyclohexane; an aromatic hydrocarbon-based solvent such as benzene, toluene, or xylene; an ether-based solvent such as diethyl ether, diisopropyl ether, tetrahydrofuran, 2-methyltetrahydrofuran, 4-methyltetrahydropyran, methyl tert-butyl ether, 1,4-dioxane, or cyclopentyl methyl ether; a halogen-based solvent such as methylene chloride, chloroform, 1,1,1-trichloroethane, or chlorobenzene; an ester-based solvent such as ethyl acetate, propyl acetate, or butyl acetate; a ketone-based solvent such as acetone, methyl ethyl ketone, or methyl isobutyl ketone; a nitrile-based solvent such as acetonitrile, propionitrile, or butyronitrile; and an amide-based solvent such as N,N-dimethylformamide, N,N-dimethylacetamide, or N-methylpyrrolidone. These solvents may be used singly or in combination of two or more.

When phosgene or triphosgene is used, it is preferable to use water as the temperature control medium because water has deactivation action.

The present application claims priority based on Japanese Patent Application No. 2019-053383 filed on Mar. 20, 2019. All the contents described in Japanese Patent Application No. 2019-053383 filed on Mar. 20, 2019 are incorporated herein by reference.

INDUSTRIAL APPLICABILITY

The reaction apparatus of the present invention can efficiently perform a chemical reaction with very high precision, and is thus industrially useful.

The invention claimed is:

1. A reaction apparatus comprising:
a tubular reaction unit;
a container configured to accommodate the tubular reaction unit and a temperature control medium for heat exchange with the tubular reaction unit;
a nozzle configured to eject the temperature control medium toward the tubular reaction unit in the container; and
a movable part configured to adjust an ejection direction of the nozzle, wherein the nozzle has an ejection orifice, and the ejection orifice directly faces to a starting part of the tubular reaction unit,
the tubular reaction unit is a tubular reaction line to configure a flow reactor, and
the tubular reaction line has a helical shape.

2. The reaction apparatus according to claim 1, wherein the nozzle is configured for an ejection speed of the temperature control medium of 0.1 to 2 m/s.

3. The reaction apparatus according to claim 1, wherein the reaction apparatus is so configured that a difference between a temperature of the temperature control medium at a heat generating part or a heat absorbing part of the tubular reaction unit and a temperature of the temperature control medium flowing out of the container is 1° C. or higher.

4. The reaction apparatus according to claim 1, wherein the container comprises a resistance member configured to interrupt a flow of the temperature control medium or a flow regulation member configured to regulate a flow of the temperature control medium.

5. The reaction apparatus according to claim 1, wherein the flow reactor further comprises a raw material feeding line provided on an upstream side of the tubular reaction line, and a discharge line provided on a downstream side of the tubular reaction line and configured to discharge a reaction product, which is produced in the tubular reaction line, from the tubular reaction line.

6. The reaction apparatus according to claim 5, wherein the flow reactor comprises two or more of the raw material feeding lines, and
the two or more of the raw material feeding lines are connected to each other at a mixing portion, to which the tubular reaction line is connected, so that raw materials fed from the two or more raw material feeding lines are mixed at the mixing portion and flow from the mixing portion to the tubular reaction line.

7. The reaction apparatus according to claim 4, wherein at least one of the resistance member and the flow regulation member comprises at least one member selected from the group consisting of a baffle, a porous member, and a mesh member.

8. The reaction apparatus according to claim 1, wherein the ejection orifice directly faces to a part of the tubular reaction unit where heat generation or heat absorption in use become largest.

* * * * *